UNITED STATES PATENT OFFICE.

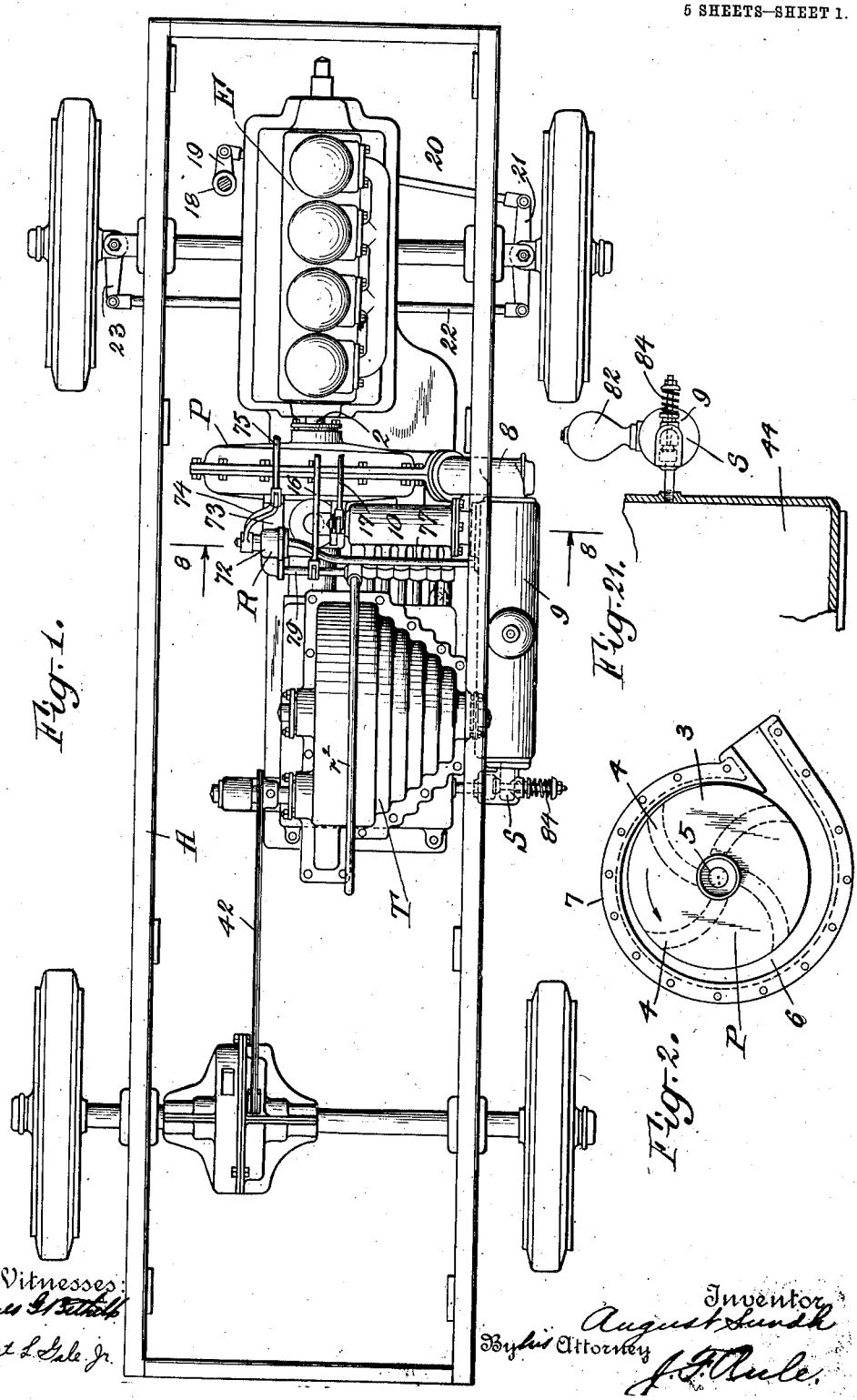

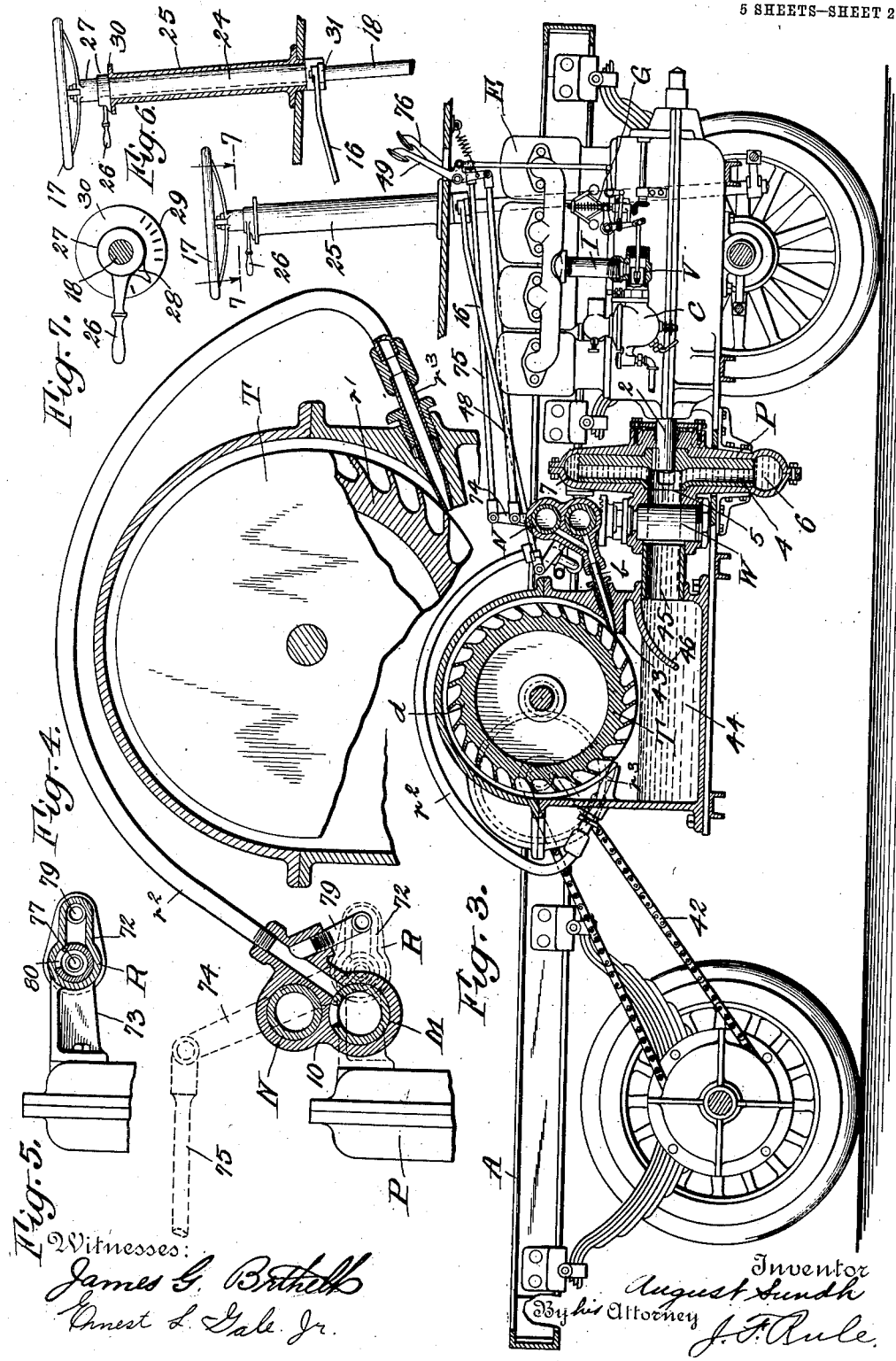

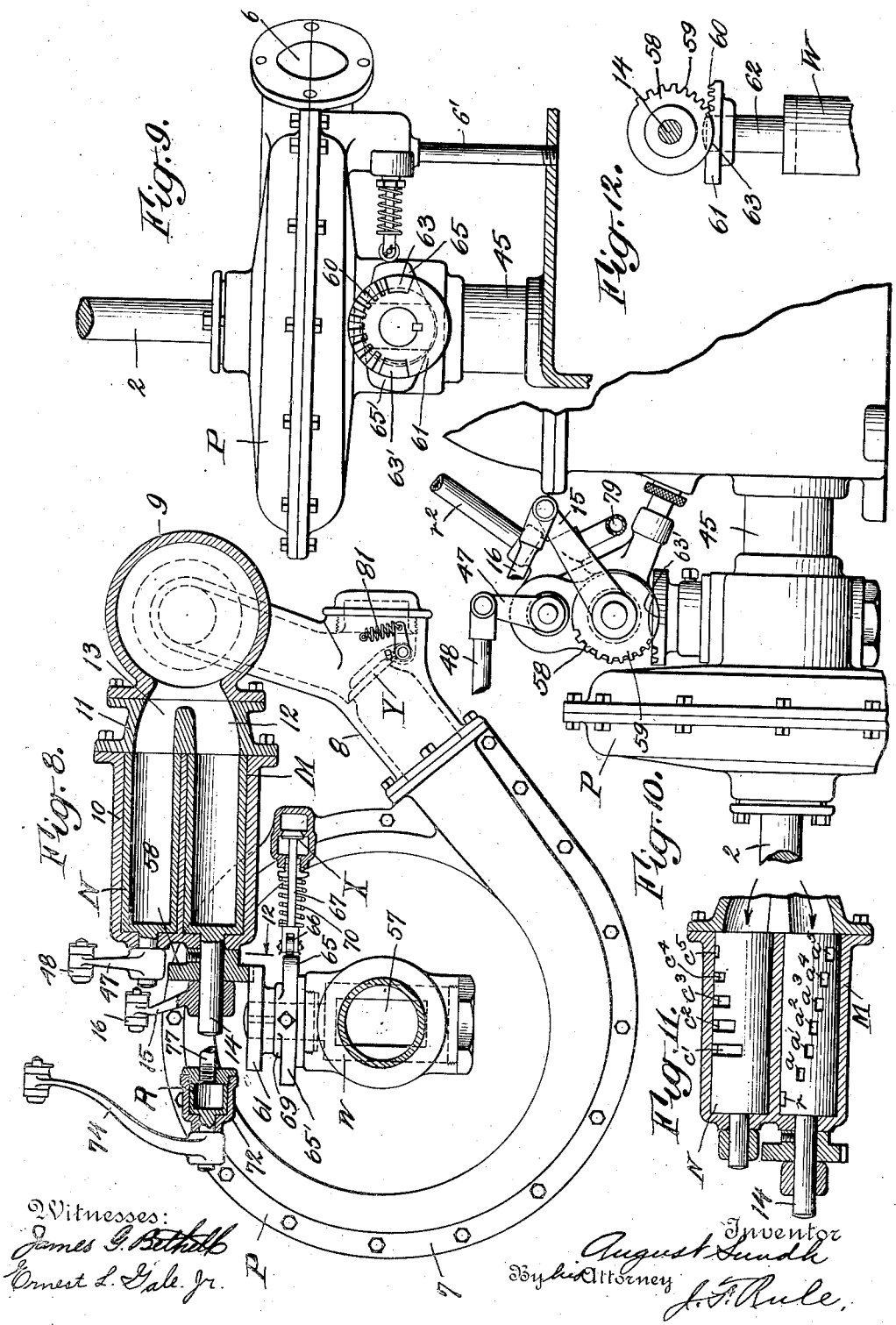

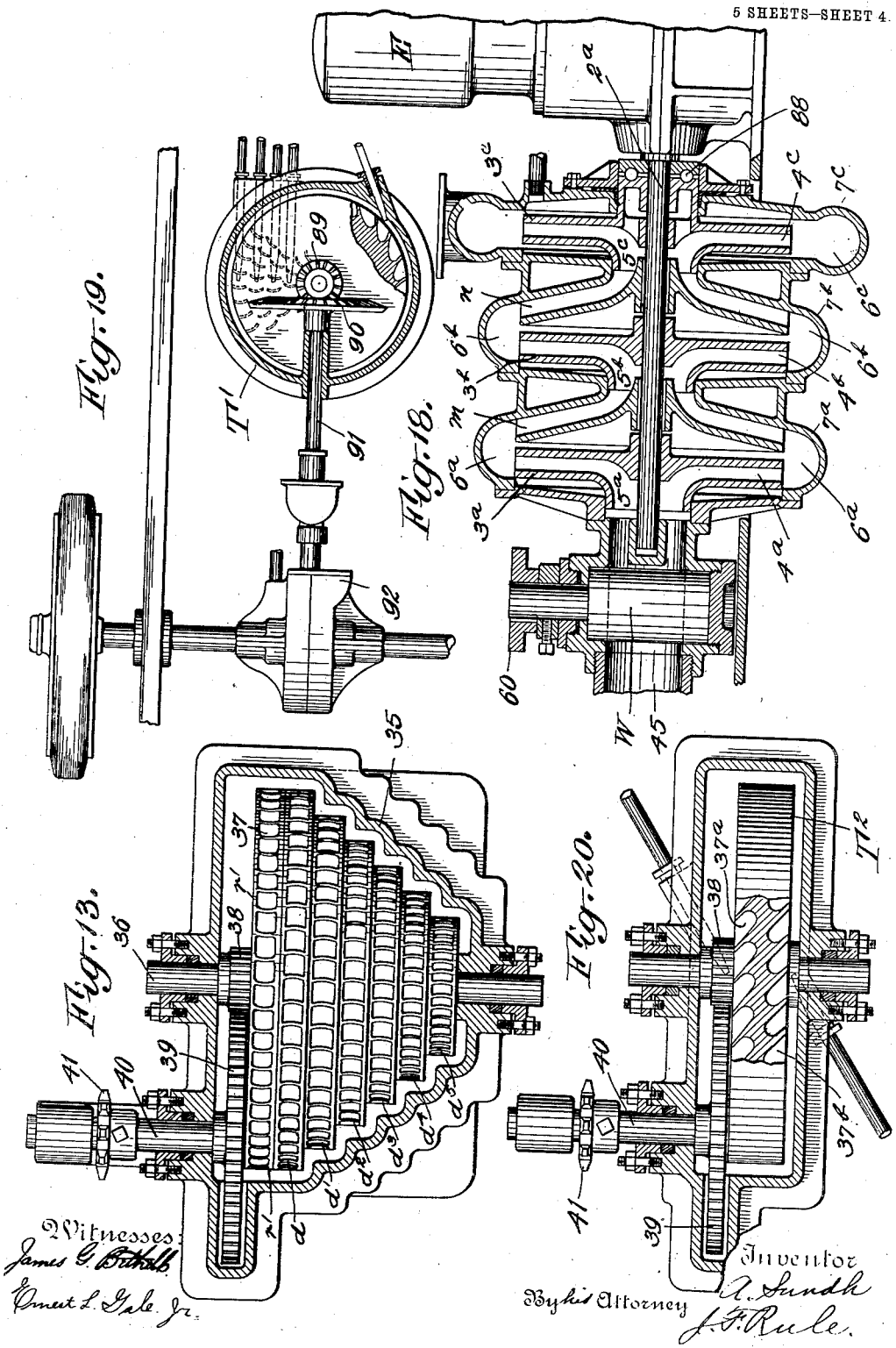

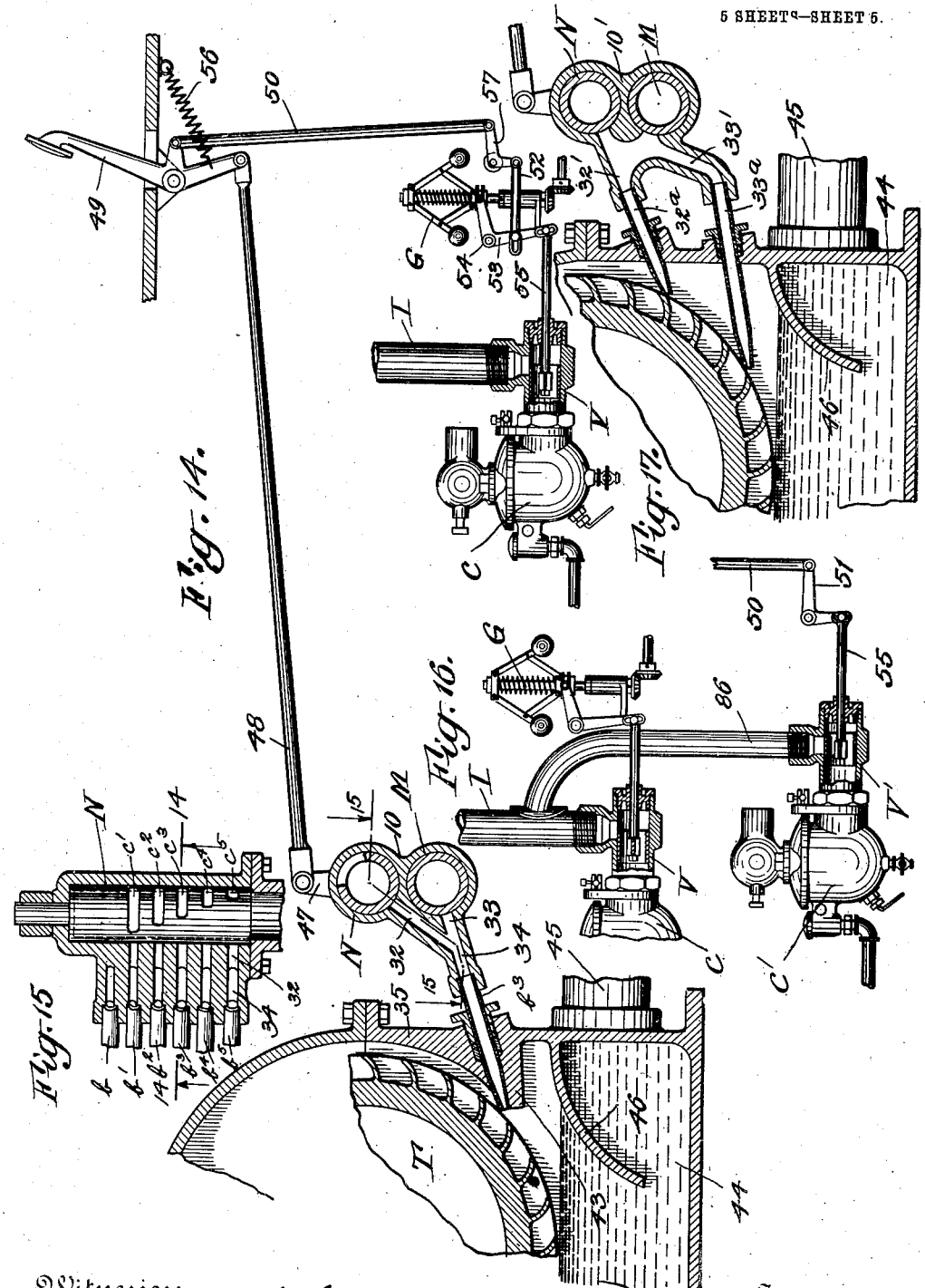

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

POWER TRANSMISSION.

1,043,480. Specification of Letters Patent. Patented Nov. 5, 1912.

Application filed December 31, 1908. Serial No. 470,271.

*To all whom it may concern:*

Be it known that I, AUGUST SUNDH, a citizen of the United States, and residing in Yonkers, in the county of Westchester and State of New York, have invented a new and useful Improvement in Power Transmission, of which the following is a specification.

My invention relates to mechanism for transmitting and controlling power by means of fluid pressure; more particularly it comprises a prime mover such as a steam engine, gas engine or other form of motor; a centrifugal pump operated by the motor, a turbine motor operated by fluid pressure supplied from the pump, and valves and other mechanism for controlling and reversing a turbine motor and controlling the operation of the prime mover and other mechanism.

The invention may be adapted to various uses as in the operation of automobiles, railway motors, elevators, etc.

Among the objects of the invention are to obtain hydraulic mechanism of the character above indicated which shall be light in weight; which shall occupy a small space; which may be driven at high speed; to obtain transmission mechanism in which the noise is reduced to a minimum; in which simplicity of construction is attained, so that the services of skilled mechanics to operate the same is dispensed with; to reduce the number of wearing parts to a minimum; to obtain a perfect control and also a smooth and perfect acceleration; to provide a construction in which the mechanism operated can be run in either direction and in which the mechanism may be reversed while running at full speed without placing an undue strain on the parts, without danger of breaking the parts, and in which power applied to the gearing in a reverse direction will act as a brake without any shock or jar to the mechanism; to provide a construction in which the prime mover can be run continuously and at a constant speed if so desired while the machinery operated may be driven at variable or any desired speed; to provide in combination with the prime mover a governor which will normally maintain a constant speed of the prime mover and in connection therewith means for increasing the power and speed whenever desired; to provide a construction in which the speed can be reduced from a maximum to a minimum and at the same time the torque increased from a minimum to a maximum, or vice versa; to provide for a minimum of loss of power from friction of the moving parts; to reduce the number of packings usually employed in hydraulic transmission mechanism of this character.

Various other objects and novel features of the invention will appear hereinafter in connection with the detail description of the construction embodied in my invention.

The scope of the invention and novel combinations of elements are defined in the appended claims.

Referring to the accompanying drawings in which is illustrated mechanism embodying one form of my invention as applied to an automobile, Figure 1 is a plan view of an automobile truck with the present invention applied thereto; Fig. 2 is a detailed view of the pump; Fig. 3 is a part sectional elevation of the mechanism shown in Fig. 1; Fig. 4 is a detailed view of a turbine motor and valve mechanism controlling the supply of fluid thereto; Fig. 5 is a detail of an emergency valve for controlling the supply of fluid in the turbine motor in the reverse direction; Fig. 6 is a sectional detail of the steering head and controlling lever; Fig. 7 is a detailed sectional view taken on the line 7—7 of Fig. 3; Fig. 8 is an elevation view of the pump, showing the various valves in section; Fig. 9 is a plan view of the pump; Fig. 10 is a fragmentary elevation view showing various features of the valve mechanism; Fig. 11 is a sectional view of valves controlling the supply of fluid to the turbine; Fig. 12 is a detail of an interlocking valve controlling device; Fig. 13 is a plan view of the turbine motor; Fig. 14 is a view on the line 14—14 of Fig. 15 showing means for manually simultaneously increasing the power of the prime mover and supplying extra power to the turbine motor; Fig. 15 is a detailed view on the line 15—15 of Fig. 14 of a valve operated by the device shown in Fig. 14; Fig. 16 is a detailed view of a modification in which an additional carbureter and valve for manually controlling the supply of fuel to the motor is provided; Fig. 17 is a modified arrangement of the nozzles for supplying fluid from the valves to the turbine; Fig. 18 shows a modification in which a plurality of pumps are arranged in series; Fig. 19 shows a modification of the turbine motor and gearing between the same and the rear axle of the automobile; Fig. 20 shows a modified form of turbine wheel; Fig. 21 is a detailed view of a relief valve between the exhaust and the pressure tank.

Referring particularly to Figs. 1 and 3, I have shown the motor and power transmission mechanism carried by the frame or truck A of an automobile. The prime mover may be any suitable form of engine or motor, and, as herein shown, an internal combustion engine E is provided. As the particular construction of this engine as applied to the present invention may be widely varied and of any approved type the same is not illustrated or described in detail. The fuel is supplied to the engine E through a pipe I which communicates with the carbureter C. During the normal operation a practically constant speed is maintained by means of the governor G connected to a valve V between the carbureter and the motor for controlling the supply of fuel from the carburetor. Keyed to the shaft 2 of the motor is a centrifugal pump P which as shown in Figs. 2 and 3, comprises a disk 3 provided with passages 4 extending from the intake 5 to the periphery of the disk 3, and communicating with the annular passage or chamber 6, formed by the casing 7 inclosing the disk 3.

The passage 6 is connected by means of a pipe section 8 to the pressure chamber 9, which latter is horizontally disposed at about the level of the upper portion of the pump. A horizontally disposed valve casing 10 extending at right angles to the pressure tank 9 is connected to the latter by means of a section 11. Within this valve casing are located two cylindrical valves M and N, connected with the pressure chamber through passages 12 and 13 formed in the section 11. The valves M and N are journaled for rotation in the casing 10, and the valve M is provided at its outer end with a stem 14 to which is secured a crank arm 15 connected by a link 16 to the steering apparatus. The steering mechanism comprises the steering wheel 17, secured to the upper end of the shaft 18, provided at its lower end with the crank arm 19 connected by a link 20 to the lever 21. The lever 21 is connected by a link 22 to the lever 23. The levers 21 and 23 are connected to the front wheels of the automobile for moving the same about vertical axes to guide the machine in a well-known manner.

Mounted for rotation on the shaft 18 is a sleeve 24 journaled in the tubular casing 25. Secured to the upper end of the sleeve 24 is a collar 27 to which is secured the controlling lever 26. The collar 27 is provided with a pointer 28 which as the lever 26 is rotated moves over scale markings 29 on the flange 30 formed on the upper end of the casing 25. The link 16 is connected to a crank arm 31 on the lower end of the sleeve 24.

The valve casing 10 is provided with a series of passages 34, each of which is branched to form passages 32 and 33 adapted to be placed in communication with valve ports in the valves N and M, respectively. A series of nozzles $b$, $b'$, $b^2$, $b^3$, $b^4$, and $b^5$, extend from the passages 34 through the casing 35 of the turbine motor T in a position to supply fluid under pressure to the various sections of the turbine. The valve M is formed with a series of ports $a$ to $a^5$, which are adapted to be successively brought into communication with the nozzles $b$ to $b^5$, respectively, as the valve is rotated in a forward direction from its central position. The size and arrangement of these ports is such that as each is brought into alinement with a passage 33, the preceding port is closed, so that as each port is completely opened the others are cut off. The valve N is provided with a series of ports $c^1$, $c^2$, $c^3$, $c^4$, $c^5$, which, as the valve is rotated from its normal position, are brought successively into communication with the nozzles, $b^1$, $b^2$, $b^3$, $b^4$, $b^5$. These latter ports are made of such a length that more than one may be opened at a time, that is, each port remains open as its succeeding ports are opened, so that any number of these ports may be opened at one time.

The turbine motor T comprises a casing 35, in which is journaled a horizontally disposed shaft 36, on which is mounted a series of turbine wheels or disks $r'$, $d$, $d^1$, $d^2$, $d^3$, $d^4$, $d^5$. These disks may be separately formed, or may all be cast integral and are each provided with a series of pockets 37 formed in their peripheries, adapted to receive fluid pressure for operating the turbine. The pockets 37 in the disk $r'$, which may be called the reversing disk, are inclined in the opposite direction from those of the disks $d$, $d^1$, etc., as the latter are adapted to receive fluid pressure during the forward rotation of the turbine wheel, while the disk $r'$ receives pressure in the direction to cause backward rotation of the turbine. Secured to the shaft 36 is a pinion 38 in mesh with the gear wheel 39 carried by a shaft 40, also journaled in the casing 35. Secured to the shaft 40 is a sprocket wheel 41 which drives a sprocket chain 42 operating a sprocket wheel secured to the rear axle of the automobile.

The casing 35 of the turbine is provided with an extension or flange 43 extending on both sides of the nozzles $b$, $b^1$, etc., and supporting the nozzles in close proximity to the turbine disks, so that the full pressure of the fluid from the nozzles will be applied to the turbine disks. Any suitable liquid, such as water or light oil, may be used in the circulating system. The suction pipe 45 leading from the exhaust or discharge chamber 44 to the intake 5 of the centrifugal pump always remains filled with liquid during the normal operation. The shield 46 is provided in the exhaust chamber in position to prevent air, which may be drawn down by the turbine, from entering the pump and thereby decreasing its efficiency.

The operation of the mechanism so far described, is as follows: Assuming the motor E to be running, and the controlling lever in its central position as shown, the pump P will run, however, the circulation of liquid through the turbine being cut off at the valves M and N and also by a valve W, the operation of which will be fully described later. If now the operator wishes to start the machine in a forward direction, the hand lever 26 is turned to the right to bring the pointer 28 to the first scale marking to the right of the central position. This movement of the controlling lever rotates the sleeve 24 and pulls the link 16 forward, thereby rotating the valve M into a position to connect the port $a$ with the nozzle $b$ leading to the large turbine wheel $d$. This movement of the valve M opens the valve W by means of mechanism to be described later, and permits the circulation of the fluid. The centrifugal pump forces the liquid through the pipe 8 into the pressure tank 9, and from thence into the valve M and through the port $a$, passage 33, and nozzle $b$ against the turbine wheel $d$, causing the latter to rotate in a clockwise direction as viewed in Fig. 3. The liquid falls from the wheel $d$ into the exhaust chamber 44 and is drawn through the suction pipe 45 to the intake 5 of the centrifugal pump, and from thence is forced outwardly through the pump, thus completing the circulation of the liquid. As the turbine wheel $d$ is geared to the axle of the automobile, the latter will be rotated to drive the machine forward, and as the turbine wheel $d$ is of large diameter, a strong torque will be obtained and enable the machine to overcome a large starting resistance. The machine will now run at a slow speed. To increase the speed the operator moves the controlling lever farther to the right to open the ports $a^1$, $a^2$, etc., to apply the fluid pressure to the turbine wheels $d^1$, $d^2$, etc. As the pressure is applied to the wheel $d^1$, which is of smaller diameter, the speed of the turbine will be increased, the speed increasing substantially in proportion to the decrease in diameter of the turbine wheel. In other words, as the fluid pressure is applied successively to the several turbine wheels, the annular velocity is increased so as to maintain a substantially constant peripheral speed of the surface to which the pressure is applied. When the valve M has been turned to the limit of its forward movement, the port $a^5$, communicates with the wheel $d^5$, and the machine will be brought to its highest normal speed; any desired intermediate speed may be obtained by adjusting the valve M to a corresponding intermediate position.

The governor G is set so as to maintain the speed of the prime mover E sufficient to drive the centrifugal pump at a speed which will supply a substantially constant quantity and pressure of fluid sufficient to operate the machine at the desired speeds under ordinary conditions. It often happens, however, that additional power is required in starting the motor, coming up a hill, or under various other conditions placing a heavy duty on the driving mechanism. In order to provide for this the mechanism illustrated in detail in Figs. 14 and 15 is employed. As here shown, the stem of the valve N (see also Fig. 8) is connected by crank arm 47 and link 48 to a foot-lever 49 at the front of the machine. A link 50 also connected with the foot-lever 49, extends downwardly and is connected to a bell-crank lever 51, which in turn is connected to a link 52, having a lost-motion connection with the bell crank lever 53, pivoted at 54. The lever 53 forms a connection between the governor G and valve rod 55 of the valve V. The governor G is normally free to operate independently of the connections between the same and the foot-lever 49. When the foot-lever 49 is depressed, however, the bell-crank 53 is rotated about its pivot to force the valve V into open position and to hold the governor balls inwardly against the action of centrifugal force.

Whenever it is desired to apply additional power to the turbine motor, as above indicated, the operator depresses the foot-lever 49, and thereby rotates the valve N, so as to bring one or more of the ports $c^1$, $c^2$, $c^3$, $c^4$, $c^5$, into communication with the corresponding nozzles $b^1$, $b^2$, etc., the fluid pressure will therefore not only be applied to the turbine wheel $d$, but also to one or more of the other turbine wheels $d^1$, $d^2$, etc., at the same time, thereby greatly increasing the power applied through the turbine motor; the connection between the foot-lever 49 and the valve V operates to open the latter to an extent proportional to the number of ports open in the valve N, thereby proportionally increasing the amount of fuel supplied to the engine E, consequently increasing its power and speed. This increase in the speed of the engine E and the centrifugal pump increases the volume and pressure of the fluid circulated sufficiently to maintain the volume and pressure of the liquid normal at the several nozzles. The parts may be so proportioned and designed that there is an increase in pressure at the nozzles when the valve N has one or more of its ports open. It will thus be seen that the normal power may be greatly increased at any time, and the extent of this increase in power regulated by the operation of the foot lever 49. When the pressure is removed from this lever, a spring 56 returns it to normal position, thereby closing the valve N, and moving the link 52 back in the position to permit the governor G to again automatically control the speed of the engine E.

A centrifugal pump of the type herein shown must be rotated at a high velocity in order to operate efficiently and maintain normal fluid pressure. Any increase in the velocity of the centrifugal pump beyond its normal speed results in an increase in the quantity and pressure of the fluid which increase very rapidly under a proportionately small increase in the speed. It will therefore be seen that the manual control of the engine E by which an increase in its speed is obtained will readily supply the necessary increase in volume and pressure of fluid required when the valve N is brought into operation.

During the normal operation when the valve M alone is used to control the supply of fluid pressure to the turbine wheels, the speed and torque are regulated and can be gradually varied from a maximum to a minimum, or vice versa, with a practically constant quantity and pressure of fluid, and thereby obtain a variable speed and power, controlled without varying the speed of the centrifugal pump or the quantity or pressure of the circulating liquid. In other words, the pump P may be constantly operated at such a speed that its greatest efficiency is maintained and at the same time the speed and torque applied through the turbine to the driving axle may be varied to suit the various conditions of speed and power required. That is, the power of the engine E and pump P may be efficiently utilized under all the varying conditions of load and speed. This is a feature of great importance in providing for an effective and efficient operation of the engine throughout the wide range and variation of conditions under which it may be operated.

When it is desired to reverse the machine, the controlling lever 26 is moved to the left and rotates the valve M into position to connect the port $r$ with a tube $r^2$, extending over the turbine and connected to a nozzle $r^3$, in position to supply fluid pressure to the turbine wheel $r^1$. The turbine wheel will therefore be rotated in a clockwise direction as viewed in Fig. 4, or anti-clockwise as viewed in Fig. 3, and therefore run the automobile backward. The turbine wheel $r^1$ as shown, is the same size as the slow forward speed wheel $d$, and will therefore operate with great power, but at a slow speed. A plurality of reversing turbine disks of varying diameters might of course be provided corresponding with the wheels $d^1$, $d^2$, etc., to secure different speeds in the backward rotation of the turbine, but ordinarily the slow reversing speed only is required, so that the wheel $r^1$ alone is sufficient to meet the ordinary requirements.

A valve W located in position to control the supply of fluid to the intake of the centrifugal pump is provided with a port 57 which is in open positon as shown in Fig. 8, whenever fluid pressure is being supplied to operate the turbine motor. When the valve M is brought to its closed position the valve W is also closed by means of the following mechanism: Secured to the valve stem 14 is a mutilated gear wheel 58 (see Figs. 8, 9, 10 and 12) provided with gear teeth 59 adapted to mesh with corresponding gear teeth 60, formed on a horizontal disk 61. The latter is secured to the stem 62 of the valve W. The disk 61 is provided with recesses 63 and 63' on opposite sides of the gear teeth 60. These recesses are curved to correspond with the smooth portion of the periphery of the wheel 58, and in position to engage the latter when the teeth 59 and 60 are out of mesh. When the valve M is closed, gear teeth 59 and 60 are in mesh and the valve W is rotated into position to close the suction pipe 45 leading to the intake of the centrifugal pump P. When the controlling lever 26 is moved to the right from its central position so as to open the port $a$, the gear wheel 58 rotates the valve W into the position shown in Figs. 8 and 12, thereby opening the port 57. The disk 58 is now in engagement with the recess 63, thereby locking the valve W in open position, while permitting a continued rotation of the valve M to open the ports $a^1$, $a^2$, etc. When the valve M is reversed the disk 58 engages the recess 63' to lock the valve W in open position. Secured to the stem of the valve W is a collar 69 provided with cams 65 and 65', beneath the recesses 63 and 63', respectively. A valve X in position to control the flow of fluid through the passage 6 around the centrifugal pump is provided with a valve stem 67 carrying an antifriction roller 66, in position to be operated by the cams 65 and 65'. When the valve W is in open position, as shown in Fig. 8, the cam 65 engages the roller 66 and holds the valve X closed. When the valve M is moved to its central position and the valve W is closed, the coil spring 70 surrounding the valve stem 67 opens the valve X to connect the passage 6 through a pipe 6' with the interior of the turbine casing, thereby permitting the escape of any liquid contained within the centrifugal pump. When the valve M is reversed the cam 65' operates to close the valve X. It will be noted that when the disks 58 and 61 are in their interlocked positions as shown in the drawings, the cam 65 is in position to hold the valve X closed.

It will be apparent from the above description that when the controlling lever is brought to central position, the valve W will be closed, and the valve X will be opened. The supply of fluid pressure to the turbine motor is therefore cut off, and the machine brought to a standstill; the engine E and the centrifugal pump P continue to operate at normal speed. The valve W at this time cuts off the supply of liquid to the intake 5 of the pump, and a partial vacuum is produced at this point, owing to the centrifugal force tending to throw the liquid out through the radial passages 4. The valve X being now open an excess of pressure in the annular passage 6 is prevented. As the vacuum produced at the intake 5 balances the centrifugal force tending to throw the liquid outward through the disk 3 of the centrifugal pump, the pump will run therefore so that there is practically no load on the engine E. The governor G acts to automatically maintain the normal speed of the engine and pump, and the latter which is made quite heavy acts as a fly wheel and secures a smooth operation of the engine. The engine at this time consumes very little energy, but is kept at full speed so that its power may immediately be effectively applied to the turbine motor when it is needed.

Under ordinary conditions, the application of fluid pressure in the reverse direction to the turbine T is controlled by the valve M as before explained; but in addition to this controlling means I provide an independent valve R for controlling the application of power in the reverse direction. This valve may be called an emergency valve, as it is adapted to quickly apply power in the reverse direction even while the valve M is open, and effects a braking action on the turbine or motor, operating to quickly bring the machine to a stop even when it is operating at a high speed. The construction of this reversing valve mechanism is as follows: A valve casing 72 (see Figs. 1, 4, 5 and 8) is connected by means of a bracket 73 to the casing of the pump P. The stem of the valve R journaled in the casing 72 has secured thereto a crank-arm 74 connected by a rod 75 to the foot lever 76, located adjacent to the foot lever 49. A pipe 77 establishes communication between the interior of the valve R and the pressure tank 9. A pipe 79 extends from the valve casing 72 and communicates with the pipe $r^2$, which supplies the reversing fluid pressure. The valve R is provided with a port 80 which is normally in position to cut off communication between the pipes 77 and 79. When the foot lever 76 is operated, the valve R is rotated so that the port 80 establishes communication between the pipes 77 and 79. Fluid pressure is therefore supplied to the reversing turbine wheel $r'$ as follows: from the centrifugal pump to the pressure tank 9, from the latter through the pipe 77 to the interior of the valve R, through the port 80, casing 72, pipes 79 and $r^2$, and nozzle $r^3$, to the reversing turbine wheel $r'$.

It will be seen from the above construction that when the foot lever 76 is operated to open the emergency valve, a back pressure is immediately supplied to the reversing turbine wheel $r'$. This emergency valve R may therefore be opened at any time independently of the position of the main valve M. This is of great practical importance in securing full control of the machine and enabling the speed to be quickly reduced or the machine brought to a standstill. If the machine is running at slow speed, with the fluid pressure supplied to the large turbine wheel $d$, and the emergency valve is opened, a back pressure equal to the forward pressure will be produced so that the two forces are balanced and the machine will come to rest. If the machine is running at a high speed, with the fluid pressure applied for example to the small turbine wheel $d^5$, and it is desired to quickly stop the machine, the valve R is opened and immediately produces a back pressure on the turbine wheel $r'$, which produces a retarding force greatly exceeding the driving power applied to the turbine wheel $d^5$, so that the forward driving power and momentum are quickly overcome, and the machine brought to a standstill. This valve mechanism may therefore be used both for reducing the speed and also for stopping the driven mechanism. It may also be used as a brake when the machine is going down an incline, to retard the speed. It will be understood that the foot-lever 76 may also be operated to only partially open the port 80 so that the effectiveness of this reversing mechanism may be controlled at the will of the operator.

A check valve Y, Fig. 8, is provided in the pipe 8, between the pump and the pressure tank 9, in order to prevent a backward flow of the fluid from the pressure tank when the pressure is relieved from the pressure side of the centrifugal pump. In this way the pressure in the tank 9 is always maintained so that it may be immediately applied to the turbine when the valve M is opened. The valve Y is closed by a spring 81 when the motive fluid is not being supplied through the pipe 8.

Located above the pressure tank 9 and connected therewith is an air reservoir or dome 82, which is filled with air under compression, and acts as an accumulator, so that when the valves are first opened to supply fluid to the turbine the pressure is maintained until the centrifugal pump has taken hold with full force; this air chamber also acts as a cushioning device to maintain an even pressure on the fluid.

A relief valve S (Figs. 1 and 21) controls a passage between the discharge chamber 44 of the turbine and the pressure tank 9. This valve is set so that it will only open when the pressure in the tank 9 becomes excessively high, which might occur accidentally, as for example when the valve N is opened and the pressure becomes too great owing to an excessive increase in the speed of the pump. The valve S is normally held closed by a coil spring 84 surrounding the valve stem.

Fig. 16 shows a modification in which a manually controlled valve V' is provided in addition to the valve V controlled by the governor G. The valve V is controlled by the governor G in the same manner as with the construction shown in Fig. 14. In the arrangement shown in Fig. 16, however, the valve V' is connected to the foot lever for operation independently of the governor, and controls the extra supply of fuel from an additional carbureter C'. A pipe 86 extends from the valve V' to the pipe 1 above the valve V. The bell crank 51 is in this instance connected directly to the valve piston 55.

In Fig. 17 the valve casing 10' for the valves M and N is somewhat modified in form and provided with passages 32' and 33' connecting with separate series of nozzles $32^a$, and $33^a$, for the passage of fluid from the valves N and M, respectively.

In Fig. 18 I have shown a plurality of centrifugal pumps arranged in series or tandem. In this arrangement the shaft $2^a$ of the motor is extended to receive a plurality of rotary disks $3^a$, $3^b$, and $3^c$, which are keyed to the shaft. These disks are provided, respectively, with radial passages $4^a$, $4^b$, and $4^c$, extending from the intakes $5^a$, $5^b$, and $5^c$, of the respective disks. The casing for these disks comprises the sections $7^a$ $7^b$, and $7^c$ shaped to form annular passages $6^a$, $6^b$, and $6^c$, surrounding the rotary disks. The passages $m$ and $n$ formed in the sections $7^a$ and $7^b$ extend from the annular passages $6^a$ and $6^b$ to the intakes $5^b$ and $5^c$. Ball bearings 88 are provided to take up the end thrust between the centrifugal pump and the engine. In operation, liquid is drawn through the pipe 45 to the intake $5^a$ and thrown outward by centrifugal force through passages $4^a$, into the annular passage $6^a$, from thence flows through the passages $m$ to the intake $5^b$ of the next pump and from thence is forced through the passages $4^b$, $6^b$, $n$ to the intake $5^c$ and through the passages $4^c$ and $6^c$, and from thence to the pressure tank. By this arrangement the liquid pressure is greatly increased, being substantially proportional to the number of centrifugal pumps or rotary disks. The pressure on this may of course be varied as desired.

Fig. 19 shows a modification in which the turbine T' is arranged for rotation about a vertical axis. A modified form of gearing is also provided between the turbine and driving axle and comprises a bevel pinion 89 secured to the turbine shaft and driving a bevel gear 90 connected to a shaft 91 extending rearwardly to any well-known form of gearing in the casing 92 mounted on the rear axle of the machine.

Fig. 20 shows a further modification in which a single turbine wheel $T^2$ is provided with a plurality of annular series of pockets $37^a$, $37^b$, arranged concentrically in the lateral faces of the turbine wheel. This arrangement results in a considerable economy of space required by the turbine.

As the centrifugal pump P is adapted to rotate in one direction only, the direction of movement of the prime mover would never be reversed, the reversal of the driven mechanism being accomplished as previously explained. When a load is applied to the driven mechanism so great that the power supplied by the prime mover is not sufficient to operate said mechanism, the turbine wheel and the driven mechanism may stop, but the motor will continue to run. This is of great practical advantage over the usual arrangements, in which, when there is a heavy load, the prime mover is slowed down and then stopped, especially if an internal combustion engine is employed and has to be started manually, resulting in delays and much annoyance and loss of time.

With the present construction the centrifugal pump is designed to run at a high speed, and a high speed engine may therefore be used. With a high speed engine great power may be obtained with a proportionately light engine. As the pump itself acts as a fly-wheel for the engine, and for this purpose need not be very heavy owing to the high speed of rotation, the usual heavy fly-wheel may be dispensed with. The mechanism also requires but little space. The other hydraulic mechanism, including the turbine motor and connections between the same and the pump, is also light and compact as compared with hydraulic power transmitting mechanisms that have heretofore been employed for similar purposes. The present mechanism is therefore well adapted for use in automobiles, not only trucks for heavy service as illustrated, but also for pleasure automobiles. The use of hydraulic drives has heretofore been greatly limited on account of the space required and the excessive weight, so that they could not be employed with advantage on light vehicles. The present invention is well adapted for this latter purpose. It is not limited, however, to use with automobiles, but may have a wide range of application.

I wish not to be limited to the particular forms of construction herein shown, as the same may be varied within wide limits to adapt the same to the various uses to which the invention may be put, various changes in the details of construction and arrangements of parts might also be made by those skilled in the art, without departing from the spirit and scope of the invention.

What I claim as new and desire to secure by Letters Patent, is:—

1. The combination with a prime mover, of a centrifugal pump connected thereto, means for completing a fluid circulating system through the pump, a motor adapted to be operated by the circulating fluid, means for cutting off the supply of fluid to the motor, and a device for cutting off the passage between the motor and the suction port of the pump.

2. The combination with a prime mover, of a centrifugal pump connected thereto, a device operated by fluid pressure supplied from the pump, means for cutting off the supply of fluid pressure to said device, and means for cutting off the flow of fluid to the intake of the pump.

3. The combination with a centrifugal pump and means for operating the same, of a motor adapted to be operated by the pump, means for conducting fluid under pressure from the pump to the motor to operate the latter, a return passage for the fluid from the motor to the intake of the pump, and a valve located in said passage for closing the latter while the pump is running and thereby creating a vacuum at the intake of the pump.

4. The combination with a prime mover, of a centrifugal pump connected thereto, a casing inclosing the pump, a motor, means for conveying fluid under pressure from the pump to the motor, a return passage from the motor to the pump, means for cutting off the supply of fluid pressure to the motor, a device for closing said return passage, and means for reducing the pressure in said casing while the pump is running with the fluid pressure supply cut off from the motor.

5. The combination with a prime mover, of a fly-wheel therefor provided with passages extending from the hub to the periphery of the wheel for the circulation of a liquid, a casing inclosing said wheel and provided with intake and pressure ports, means located externally of the casing for completing the circulation of fluid from the pressure port to the intake port, means to cut off the external circulation, means to cut off the passage of fluid at said intake and thereby create a vacuum to balance the centrifugal force, and means to reduce the pressure in the casing.

6. The combination with a centrifugal pump, of a rotary turbine motor, a plurality of ducts extending to the motor for conveying fluid under pressure, a valve provided with a plurality of ports, means for operating the valve to bring the ports successively into communication with said ducts and to cut off communication with the remaining ducts as each port is opened, a second valve provided with a plurality of ducts, means for operating said second valve to bring any desired number of its ports into communication with the respective ducts, means operating said valves, and means for conveying fluid under pressure from the pump to said valves.

7. The combination with a centrifugal pump, of a rotary turbine motor, means for supplying fluid under pressure from the pump to the motor in a direction to cause a forward rotation of the motor, and means for independently applying fluid pressure in the reverse direction.

8. The combination with a centrifugal pump, of a rotary turbine motor, a plurality of ducts, extending to the motor at different distances from its axis for supplying fluid pressure to the motor, a valve controlling the passage of fluid through said ducts, means for conveying fluid from the pump through said valve and ducts, an additional duct extending to the motor for conveying fluid thereto, and applying power in the reverse direction, and an additional valve operable independently of the first named valve for controlling the reverse pressure.

9. The combination with a prime mover, of a centrifugal pump, means for automatically maintaining the speed of the prime mover and pump substantially constant and thereby securing a discharge of fluid from the pump at uniform velocity and pressure, valve mechanism controlling the flow of fluid, mechanism operated by said fluid, and a manual device to effect an increase in the speed of the prime mover and thereby increase the quantity of fluid supplied to said operated mechanism, said device also being connected to operate the valve mechanism.

10. The combination with a prime mover, of a centrifugal pump connected thereto, means for automatically maintaining a constant speed of the pump, a hydraulic motor, means for conveying a liquid under pressure from the pump to said motor and discharging it at the motor to operate the same, means to increase the area of discharge at the motor, and mechanism for effecting an increase in the speed of the prime mover and thereby increasing the volume of fluid delivered by the pump when said discharge area is increased.

11. The combination with a prime mover, of a centrifugal pump connected thereto, a governor regulating the speed of the prime mover, a turbine motor, means for conveying fluid under pressure from the pump and discharging it at the turbine to operate the latter, mechanism for varying the area of the fluid passage, and means for automatically effecting an increase in the speed of the prime mover, and thereby increasing the volume of fluid delivered by the pump when said area is increased.

12. The combination with a prime mover, of a centrifugal pump connected thereto, a governor controlling the speed of the prime mover, a turbine motor, means for conveying fluid from the pump and discharging it at the motor to operate the latter, mechanism for varying the cross-sectional area of the fluid passage leading to the motor, and means to automatically effect an increase in the speed of the prime mover when said mechanism is operated to increase the area of the fluid passage, said increase in speed being sufficient to maintain a substantially constant pressure of the fluid at the point of discharge.

13. In hydraulic power transmission mechanism, the combination with a prime mover, of a centrifugal pump connected thereto, means for normally maintaining a constant speed of the prime mover, a rotary turbine motor, means for conveying fluid under pressure from the pump and discharging it against the turbine to rotate the latter, mechanism for normally varying the speed and torque of the turbine motor by varying the radial distance of the point of discharge from the axis without substantially varying the discharge area, and means for obtaining an increase of power at the motor by increasing the area of discharge and also increasing the speed of the prime mover and pump.

14. In hydraulic power transmitting mechanism, the combination with a prime mover, of a pump connected thereto, a governor to maintain a constant speed under normal operation, a rotary turbine motor, a plurality of ducts in position to discharge fluid against the turbine at different radial distances from its axis, means for establishing communication between the pressure port of the pump and any desired one of said ducts and thereby varying the speed and torque of the motor without materially varying the volume of fluid discharged, additional means for opening any desired number of said ducts, and mechanism for automatically effecting an increase in the speed of the prime mover and the output of the pump when said additional means is operated, the increase in the output of the pump varying with the number of ducts opened so as to maintain an approximately constant discharge pressure.

15. The combination with a centrifugal pump, of a turbine motor, means for conveying liquid from the pressure side of the pump to the motor to operate the latter, means for conveying the discharge liquid from the motor to the pump, and a shield in position to prevent air from being drawn from the motor into the pump.

In testimony whereof, I have signed my name to this specification in the presence of two subscribing witnesses.

AUGUST SUNDH.

Witnesses:
 JAMES G. BETHELLS,
 JOHN F. RULE.